April 16, 1957 C. A. GALLAGHER 2,788,929
CAR TOP CARRIER
Filed March 2, 1955 2 Sheets-Sheet 2
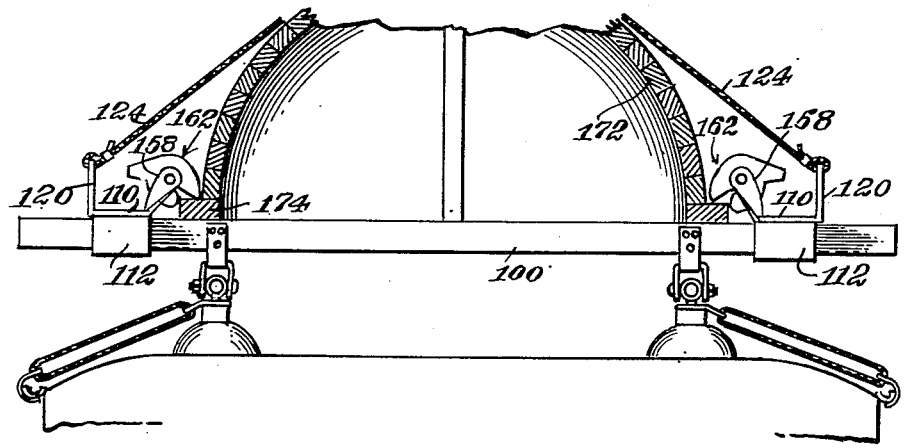
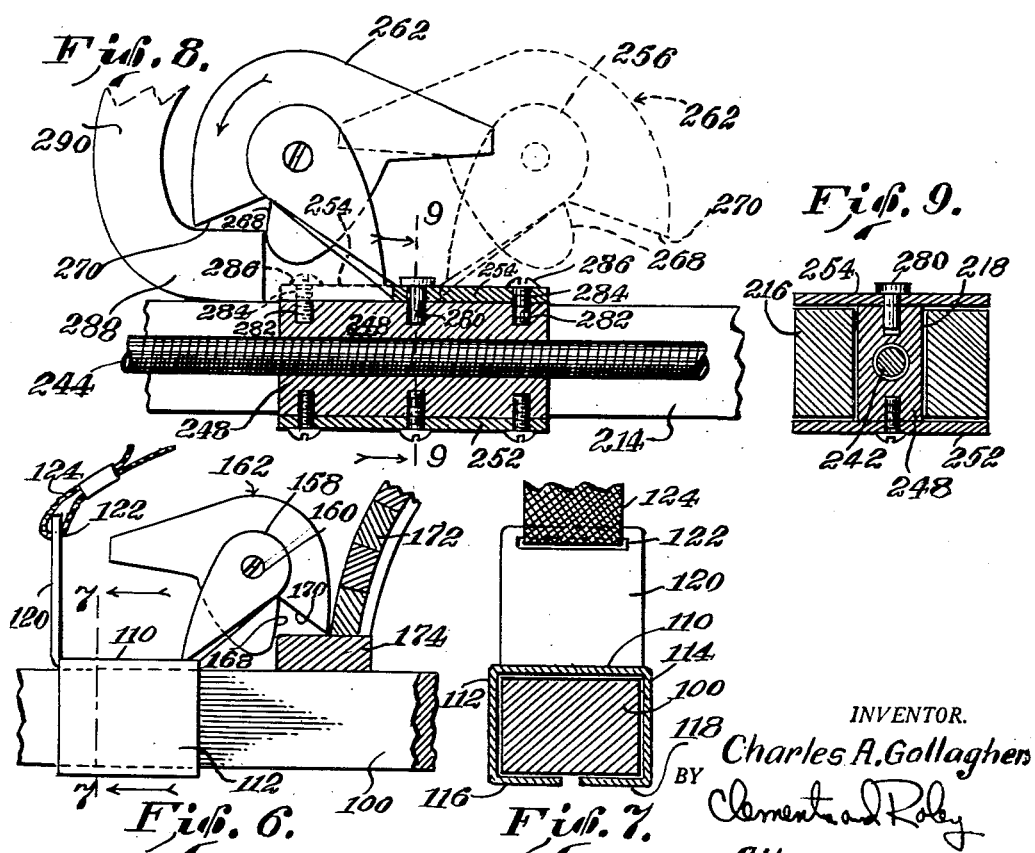
INVENTOR.
Charles A. Gallagher
BY
Clements and Roley
Attorneys.

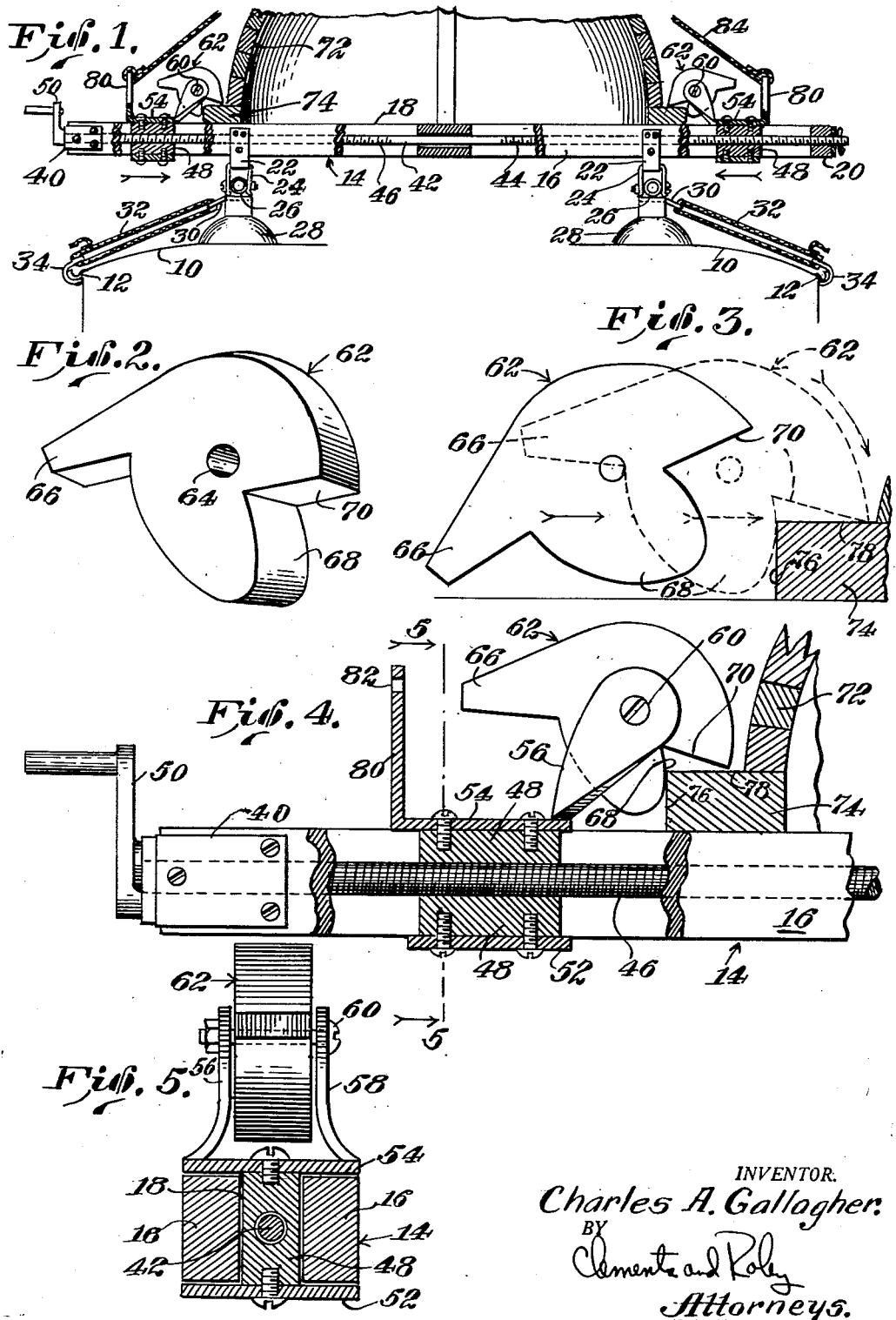

United States Patent Office 2,788,929
Patented Apr. 16, 1957

2,788,929

CAR TOP CARRIER

Charles A. Gallagher, West Rutland, Vt.

Application March 2, 1955, Serial No. 491,624

16 Claims. (Cl. 224—42.1)

This invention relates to a car top carrier and particularly to carriers adapted to be mounted on the top of an automobile for carrying loads, such as boats, lumber, luggage etc.

An object of this invention is to provide a carrier having an improved clamping means for engaging and securely holding a load thereon.

Another object of this invention is to provide a carrier of the class described having a movable and rotatable clamping means adapted to engage a load such as the edge of a board or the gunwale of a boat with both lateral and transverse pressure.

An additional object of this invention is to provide a carrier of the character described having a pair of relatively movable reversible clamping members adapted, when approaching or receding from each other as desired, will automatically engage and clamp the load securely thereon.

Other objects will appear in connection with the following specification taken with the accompanying drawings forming a part thereof.

In the drawings:

Fig. 1 is a side elevation partly in section showing my novel car carrier applied to the top of an automobile with the improved clamping members engaging and securing a load thereon;

Fig. 2 is an enlarged perspective view of my novel improved clamping member;

Fig. 3 is an enlarged fragmentary view showing the clamping member of Fig. 2 in two positions, one position being the open or normal position, shown in solid lines, and the other position being the locking position shown in dotted lines;

Fig. 4 is a somewhat enlarged fragmentary side elevational view partly in section, of the left end of Fig. 1 showing one form of the actuating or operating means for the clamping members;

Fig. 5 is a cross-section taken substantially along the line 5—5 of Fig. 4;

Fig. 6 is a fragmentary side elevation, partly in section, of my novel clamping member showing a modified form of the actuating or operating means and guide means therefor;

Fig. 7 is a cross-section taken susbtantially along the line 7—7 of Fig. 6;

Fig. 8 is a fragmentary, side elevation, partly in section, of a further modification of my novel clamping means;

Fig. 9 is a cross-section taken substantially along the line 9—9 of Fig. 8; and

Fig. 10 is a side elevation, partly in section, similar to Fig. 1 but showing the modification illustrated in Figs. 6 and 7 applied to the top of an automobile.

In the several figures illustrated in the drawing like elements are indicated by like reference characters throughout the several views and attention is now directed to the modification of my invention illustrated in Figs. 1–5 wherein the preferred form of my novel car top carrier is illustrated applied to the top 10 of an automobile, not fully shown, having gutters 12 along the outer peripheral edge thereof. The specific structure of the car top 10 and gutters 12 form no part of this invention and are shown only for the purpose of illustration.

My novel car top carrier, the subject of this invention, in the form illustrated in Figs. 1–5, comprises an elongated bar 14 having transversely spaced apart sections 16 defining a longitudinally extending slot 18 therebetween which is closed by blocks 20 or the like adjacent the ends of the bar 14. The bar 14 is adapted to be disposed substantially parallel to and secured on the car top 10 by brackets 22 which are mounted near the opposite ends of sections 16. The brackets 22 carry depending U-shaped clevis members 24 to which rods or tubes 26 are pivotally attached. A plurality of suction cups 28 are attached to each rod or tube 26, and as illustrated two are preferably attached adjacent each end thereof.

A loop 30 is attached to each of the rods or tubes 26 and a strap 32 is passed through each loop. Each of the straps 32 carry a hook element 34 which is adapted to engage under the gutters 12 on each side of the car top 10. Thus, by reason of the suction cups 28 and hooks 34, the bar 14 may be securely mounted and retained in an operative horizontally disposed position on the top 10 of an automobile.

At each end of the bar 14 there is provided a substantially U-shaped clamp or clip 40 which secures the transversely spaced sections 16 and blocks 20 together. Suitably journaled in these clips intermediate the sections 16 is a screw shaft 42 having right-hand threads 44 and left-hand threads 46. Suitable nuts 48 are threadedly mounted on the right-hand threads 44 and left-hand threads 46. One end of the shaft 42 is provided with a crank 50 to rotate the shaft 42 for purposes which will hereinafter appear.

Attached to the lower portion of each nut 48, by suitable means, is a plate 52 which overlies the lower portions of sections 16 and exerts a pressure thereagainst preventing the upward bowing of the screw shaft 42 when the clamping elements are in operative position, to be explained hereinafter.

Attached to the top of each nut 48, by suitable means, is a plate 54 which similarly overlies the upper portions of sections 16. It is to be noted, Fig. 5, that sufficient clearance is provided between the plates 52, 54 and the lower and upper portions of sections 16 respectively, to allow longitudinal sliding movement therebetween. The upper plates 54 are identical and carry identical clamping means, later to be described. They are allochirally arranged on bar 14, and as all parts of each clamp are like those of the other, for the sake of brevity, only one will be described. Attention is now directed to Figs. 4–5 wherein it will be noted that attached to or integral with the upper plate 54 is a pair of upstanding brackets 56, 58 having aligned openings therein to accommodate a bolt or screw 60. A clamping member 62 having a transverse hole 64 therein is freely pivoted on the bolt 60. With specific reference to Fig. 2 it will be noted that the clamping member 62 has at one side of the pivot opening 64 an overbalancing tail portion 66 adapted normally to hold the clamping member 62 in "open" position, as shown by the solid lines of Fig. 3. On the other side of the pivot opening 64 opposite the tail portion 66 is a cam portion 68 and a jaw portion 70. In Figures 1, 3 and 4 of the drawing the clamp members 62 are shown in the locking position as holding a boat 72 by engaging the lip or gunwale 74 thereof.

Assuming that the carrier has been mounted on an automobile top as shown in Fig. 1, and that a boat 72 is to be carried thereon, the turning of the screw 42 counterclockwise, as viewed from the crank, moves the clamp members 62 apart from each other. After placing the boat 72 in position as shown in Fig. 1, the crank 50 is turned clockwise, drawing the clamp members 62 toward each other. In this movement, which is illustrated by the arrows in Fig. 3, the cam portion 68 will first engage the edge 76 of the gunwale 74 of the boat, and cause the clamping members 62 to pivot about the bolt 60, continuing the movement of the clamp members toward each other will bring the jaw portions 70 down against the surface 78 of the gunwale 74. Further slight movement will firmly grip the boat between the cam portion 68 of the clamp members 62 and the jaw portions 70 thereof will firmly press the gunwale of the boat against the bar 14.

Each upper plate 54 has secured thereto or integral therewith an upstanding bracket 80 having an opening or slot 82 therein to accommodate a strap 84 which may be used further to bind or hold the load on the bar 14.

In the modification as shown in Figs. 6, 7 and 10 the screw shaft 42 is not employed. In this modification the bar 100 has a plate 110 comprising depending side portions 112, 114 and bottom portions 116, 118 which embrace the bar 100 forming a slide member substantially C-shaped in cross-section, note Fig. 7. Attached to or integral with the plate 110 is a bracket 120 having a slot 122 therein to accommodate a strap 124. Attached to or integral with plate 110 is an upstanding bracket 158, similar to bracket 56—58, and having aligned openings therein to accommodate bolt 160 on which is pivoted a clamp member 162, identical with the clamp member 62 heretofore described.

Assuming that two elements 162 with their respective brackets and slide members are allochirally arranged on the bar 100 and a boat 172 is placed therebetween as before stated. The strap 124 is placed in the slots 122 of brackets 120 and passed over the boat 172. A pull on the strap in tightening, to bind the load, will cause the clamp members 162 to engage the gunwale 174 of the boat as above described in the operation of the clamp members 62. The boat will be firmly gripped by cam portions 168 and jaw portions 170 as well as securely bound by the strap 124.

In the modification illustrated in Fig. 8, the clamp member is shown in solid lines as being adapted to engage the inside of a boat or other load having an inturned lip 288. In this modification all parts corresponding or similar to parts illustrated in Figs. 1–5 are designated with the additional factor of 200. The upper plate 254 is pivotally mounted on the top of nut 248 and the lower plate 252 is rigidly mounted on the bottom thereof. It is to be noted that the clamping member 262 is longitudinally reversible or pivotal with respect to the position shown in Figs. 1, 3 and 4.

In order to provide the clamping member 262 with such reversible feature it is desirable though not necessary to eliminate the flange 80, as shown in the modification of Figs. 1–5, and the flange 120, of the modification shown in Figs. 6, 7 and 10. Further it should be noted that the nut 248 and lower plate 252 are of greater longitudinal length than the upper plate 254.

The upper plate 254 is pivotally secured to the nut 248 by means of a pivot pin 280. Further, the nut 248 is provided with identical openings 282 and the upper plate 254 is provided with an opening 284 which is adapted to register with either of the openings 282 and a screw 286 is adapted to be inserted therethrough to secure the clamp member 262 in either of the possible positions as desired. Thus, the clamp member 262 may be pivoted so that the cam element 268 and jaw element 270 will secure an article 290 having an inturned flange 288 on the bar 214.

Assuming that two identical clamp members 262, such as those illustrated in Fig. 8, are allochirally arranged on the bar 214, counterclockwise rotation of the screw 244 will draw the clamp members apart so that the cam portions 268 engage the lips 288 of the load 290 and continued movement thereof secures the load by the jaw portions 270 engaging over the lips 288 with the cam portions 268 tightly engaging the inner surface thereof.

If the device as illustrated in Figs. 8 and 9 is to be used in the same manner as the device of Figs. 1, 3 and 4, it is merely necessary to remove the screw 286 from the opening 282, turn the plate 254 through 180° from the position shown by the solid lines in Fig. 8 and re-insert the screw 286 in the other opening 282. The device will then be positioned as illustrated by the dotted lines of Fig. 8 and will operate as the device of Figs. 1, 3 and 4 except that it lacks provision for a strap 84.

While throughout this specification reference has been made to the carrying of a boat, it is clear that a load such as boards, sheets of plywood, wall board or other similar loads may readily and effectively be handled by this carrier.

While a specific structure has been delineated, it is to be understood that all modifications within the compass of the appended claims are to be included.

I claim:

1. A carrier of the type described adapted to be mounted on an automobile top, said carrier comprising a load carrying bar, a clamping means, mounting means mounting said clamping means on said bar for to and fro movement longitudinally thereof, said clamping means including a depending cam portion, a laterally extending jaw portion and a tail portion extending laterally substantially opposite in relation to the jaw portion, means rotatably mounting said clamping means for movement with respect to said bar with said tail portion overbalancing said jaw portion to maintain said clamping means in a normal open load receiving position with said jaw portion spaced from said bar, actuating means for moving said clamping means toward a load on the bar causing said cam portion to engage a load and overcome the overbalanced condition caused by said tail portion and rotate said jaw portion from said normal position to a clamping position with said jaw portion exerting a substantially vertical force and the cam portion exerting a substantially horizontal force against a load on the bar.

2. The structure defined in claim 1, wherein the clamping means is of substantially cylindrical configuration and is rotatably mounted for rotation about the longitudinal axis thereof, said cam and jaw portions of said clamping means being defined by having a portion of the peripheral surface of the clamping means cut-out, said cut-out portion being of substantially V-shaped configuration in longitudinal cross-section, and said tail portion extends radially outwardly a distance substantially greater than the radial distance of the jaw portion.

3. The structure defined in claim 1, wherein said mounting means comprises a plate having depending side portions embracing the load carrying bar and said actuating means for moving the clamping means toward a load comprises a flexible strap secured to the plate.

4. The structure defined in claim 1, wherein the actuating means comprises a screw shaft carried by said load carrying bar, a nut element on said screw shaft, said nut element being secured to said mounting means, and means for rotating said screw shaft.

5. The structure defined in claim 4, wherein said mounting means includes a base plate secured to the nut element, said base plate having an upstanding bracket adapted to receive a strap providing additional securement of a load to said load carrying bar.

6. The structure defined in claim 1, wherein said mounting means pivotally secures said clamping means to said load carrying bar for movement between two clamping means positions, one clamping means position being longitudinally disposed opposite the other clamping means position, said one clamping means position providing the cam and jaw portions with the clamping engagement on the to movement and the other clamping means position providing said cam and jaw portions with the clamping engagement on the fro movement thereof.

7. A carrier of the type described adapted to be mounted on an automobile top, said carrier comprising a load carrying bar, at least one load clamping means, mounting means mounting said clamping means on said bar for to and fro movement longitudinally thereof, said clamping means having a cam portion, a jaw portion and a tail portion overbalancing said jaw portion, means rotatably mounting said clamping means on said mounting means for movement with respect to said bar with said tail portion overbalancing the jaw portion to normally maintain the clamping means in an open load receiving position with said jaw portion in spaced relation to the bar, an actuating means for moving said clamping means toward a load on the bar causing said cam portion to first engage a load to rotate said jaw portion from the normal open load receiving position into a clamping position in engagement with a load to secure a load on the bar.

8. The subject matter of claim 7 in which a pair of load clamping means are mounted on said bar and positioned to engage opposite edges of a load disposed intermediate theerof, each of said clamping means being carried by a respective mounting means and mounted on said bar and said actuating means simultaneously moves the respective clamping means toward or from each other.

9. A carrier of the type described adapted to be mounted on an automobile top, said carrier comprising a load carrying bar, clamping means, mounting means mounting said clamping means on said bar for to and fro movement longitudinally thereof, said clamping means having a depending cam portion, a laterally extending jaw portion and an opposite laterally extending tail portion overbalancing said jaw portion, means rotatably mounting said clamping means on said mounting means for movement with respect to said bar between a normal open load receiving position with said tail portion overbalancing the jaw portion with said jaw portion in spaced relation to the bar and a clamping position with said jaw portion in engagement with a load on the bar, and actuating means for moving said clamping means toward a load on said bar to cause said cam portion to engage a load to rotate said jaw portion from the normal open load receiving postion into said clamping position.

10. The structure defined in claim 9, wherein said mounting means comprises a plate having depending therefrom side portions embracing said load carrying bar, and said actuating means for moving said clamping means toward a load comprises a flexible strap secured to the plate of said mounting means.

11. The structure defined in claim 9, wherein the actuating means comprises a screw shaft carried by said load carrying bar, a nut element on said screw shaft, said nut element being secured to said mounting means, and means for rotating said screw shaft.

12. The structure defined in claim 9, wherein said mounting means pivotally secures said clamping means to said load carrying bar, said mounting means comprising a base plate rigidly secured to and carrying said clamping means, said base plate being pivotally secured to said nut element for movement between two base plate positions, one of said base plate positions providing said clamping means with the clamping engagement on the to movement, the other base plate position providing the clamping means with the clamping engagement on the fro movement.

13. A carrier of the type described adapted to be mounted on an automobile top, said carrier comprising a load carrying bar, clamping means, mounting means mounting said clamping means on said bar for to and fro movement longitudinally thereof, said mounting means including a base plate having upstanding elements freely rotatably mounting said clamping means on said base plate, said clamping means having a depending cam portion, a laterally extending jaw portion and an opposite laterally extending tail portion overbalancing said jaw portion, said bar having a slot extending longitudinally thereof, a longitudinally extending screw shaft mounted in said slot, a nut element on said screw shaft travelling in said slot and attached to said base plate, whereby rotation of said screw moves said clamping means along said bar toward a load mounted thereon to cause said cam portion to engage a load on the bar to rotate the jaw portion into gripping engagement therewith.

14. The subject matter of claim 13 in which a pair of clamping means are mounted on said bar and positioned to engage opposite edges of a load disposed intermediate thereof, each of said clamping means being attached to a nut element, right and left threads on said screw shaft engaging respectively one of said nut elements at opposite ends of the bar simultaneously moving the respective clamping means toward or from each other.

15. A carrier of the type described adapted to be mounted on an automobile top, said carrier comprising a load carrying bar, clamping means, mounting means mounting the clamping means on said bar for to and fro movement longitudinally thereof, said mounting means including a base plate, said clamping means including a depending cam portion, a laterally extending jaw portion, and a oppositely laterally extending tail portion overbalancing said jaw portion, means freely rotatably mounting said clamping means on said base plate for free rotatable movement with respect to said bar between a normal open load receiving position with said jaw portion in spaced relation to the bar to a clamping position with said jaw portion in engagement with a load on the bar, actuating means for moving the clamping means toward a load on the bar including an upstanding bracket on said base plate adapted to receive a strap, whereby a pull on a strap in a direction over a load on said bar moves the clamping means toward a load causing said cam portion to engage a load and rotate the jaw portion into said clamping position in engagement therewith.

16. The subject matter of claim 15 in which the bar is provided with a pair of clamping means at the opposite ends thereof, and flexible strap means connecting the respective clamping means and adapted to pass over a load and to draw the clamping means towards each other and toward a load for clamping action therewith.

References Cited in the file of this patent

UNITED STATES PATENTS

| 603,970 | Rogers | May 10, 1898 |
| 1,569,236 | Puterbaugh | Jan. 12, 1926 |
| 2,482,708 | Gordinier | Sept. 20, 1949 |
| 2,624,497 | Newman | Jan. 6, 1953 |

FOREIGN PATENTS

| 456,927 | Great Britain | Nov. 18, 1936 |